Oct. 9, 1962   J. J. HORGAN   3,057,150
TWO DIMENSIONAL FLOATING BLOW-IN-DOOR AND FLAP EJECTOR
Filed March 27, 1961   3 Sheets-Sheet 1

INVENTOR
JOHN J. HORGAN
BY Vernon F. Hauschild
ATTORNEY

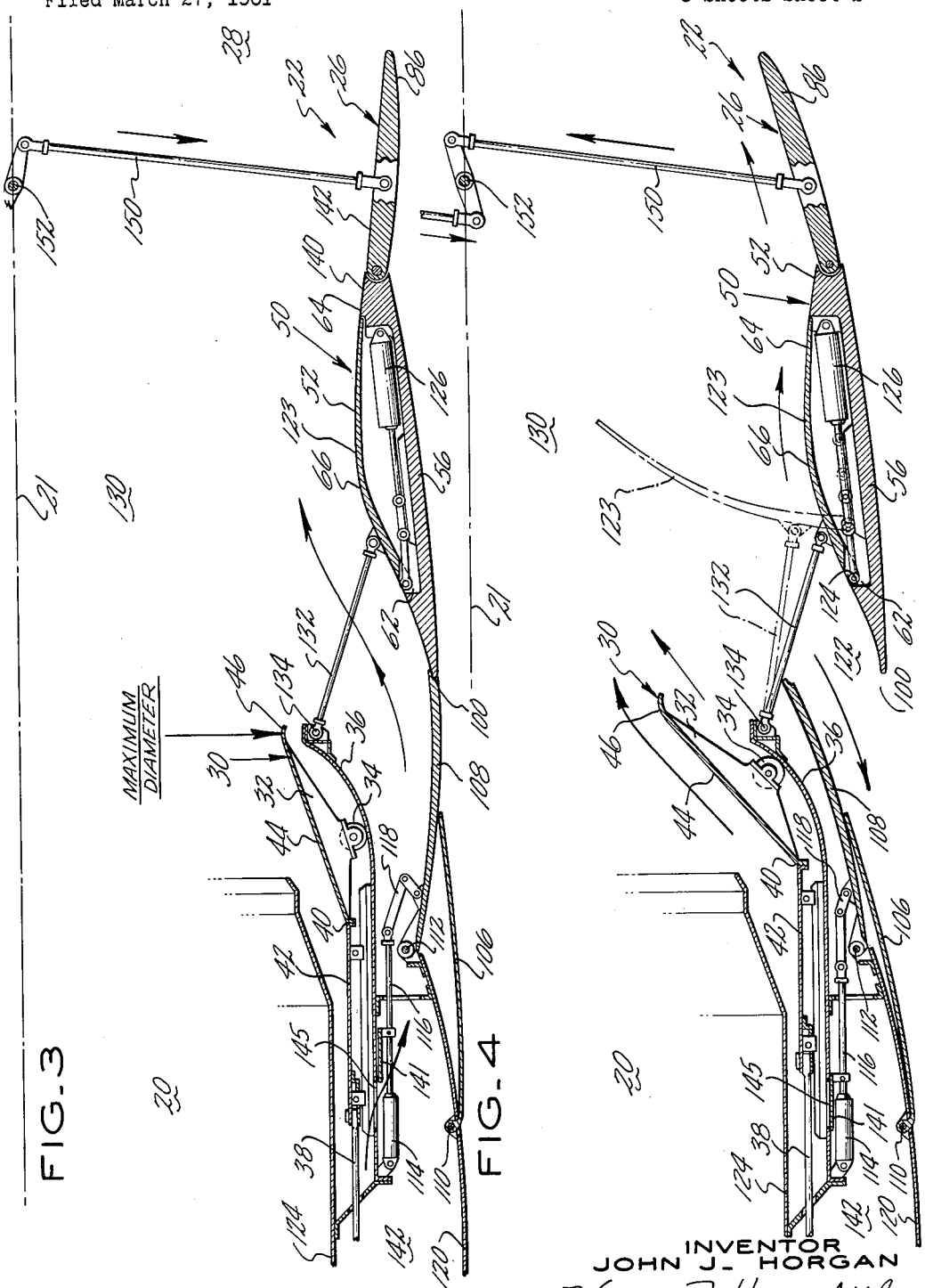

Oct. 9, 1962 J. J. HORGAN 3,057,150
TWO DIMENSIONAL FLOATING BLOW-IN-DOOR AND FLAP EJECTOR
Filed March 27, 1961 3 Sheets-Sheet 3

INVENTOR
JOHN J. HORGAN
BY Vernon F. Hauschild
ATTORNEY

United States Patent Office 3,057,150
Patented Oct. 9, 1962

3,057,150
TWO DIMENSIONAL FLOATING BLOW-IN-DOOR
AND FLAP EJECTOR
John J. Horgan, Tariffville, Conn., assignor to United Aircraft Corporation, East Hartford, Conn., a corporation of Delaware
Filed Mar. 27, 1961, Ser. No. 98,701
8 Claims. (Cl. 60—35.6)

This invention relates to exhaust nozzles and more particularly to two-dimensional ejector type exhaust nozzles of the type used with aircraft jet engines.

It is an object of this invention to teach a two-dimensional ejector type exhaust nozzle having a primary and secondary nozzle and a fixed element therebetween so contoured that said primary nozzle is of circular cross section and said secondary nozzle is of rectangular cross section and further such that the interior passage defined therebetween smoothly blends from rectangular cross section at said secondary nozzle outlet toward a circular outlet at said primary nozzle.

It is a further object of this invention to teach a two-dimensional ejector type exhaust nozzle of rectangular exterior cross section so that a plurality of such nozzles may be positioned or installed in abutting fashion with minimum low pressure or drag area created therebetween.

It is a further object of this invention to teach a two-dimensional ejector type exhaust nozzle having blow-in doors which are either aerodynamically or mechanically actuated and which consist of at least two axially spaced, overlapping, pivotal doors to provide a smooth exterior contour for all positions of said doors.

It is a further object of this invention to teach a two-dimensional ejector type exhaust nozzle having provisions for thrust reversal and further having gravity abating provisions associated with the floating flaps of the secondary nozzle.

It is a further object of this invention to teach a two-dimensional ejector type exhaust nozzle having a variable area circular primary nozzle spaced forward of a two-dimensional, variable area rectangular secondary nozzle and with a fixed member positioned therebetween having an inwardly concave inner surface and further having blow-in doors forward of said fixed member and radially outward of said primary nozzle such that with said primary and secondary nozzles in their maximum area positions and said blow-in doors closed, a convergent-divergent exhaust nozzle is formed with said primary nozzle defining the convergent portion and throat and said fixed member and secondary nozzle defining the divergent portion and outlet thereof and presenting smooth divergent walls for the exhaust gases to expand against. Further, such that with said primary and secondary nozzles in their minimum area positions and said blow-in doors open, a convergent-divergent exhaust nozzle is formed with said primary nozzle defining the convergent portion and throat thereof and with secondary air flowing through said blow-in doors and over the inner surface of said fixed member and said secondary nozzle in ejector fashion to cooperate therewith to define the divergent portion thereof. Further, such that a smooth, rectangular, exterior cross section is presented in both exhaust nozzle conditions just described.

It is a further object of this invention to teach a two-dimensional ejector type exhaust nozzle having an exterior of rectangular cross section and having an interior which is of rectangular cross section at its outlet and which smoothly changes in transition upstream thereof to become a circular cross section and having pivotal flaps defining a portion of the outlet and extending for the full rectangular dimension of said outlet while narrowing in width upstream thereof by following a line which was angular to the exhaust nozzle axis thereby establishing light weight flaps of smaller dimension which may be either aerodynamically actuated or aerodynamically assisted in actuation so that a smaller actuating force is required.

Other objects and advantages will be apparent from the specification and claims and from the accompanying drawings which illustrate an embodiment of the invention.

FIG. 3 is an enlarged cross-sectional showing of the bottom half of my two-dimensional ejector type exhaust nozzle in its high speed condition.

FIG. 4 is comparable to FIG. 3 but shows my exhaust nozzle in its low speed operating condition and with thrust reversal condition illustrated in phantom.

Figure 5:
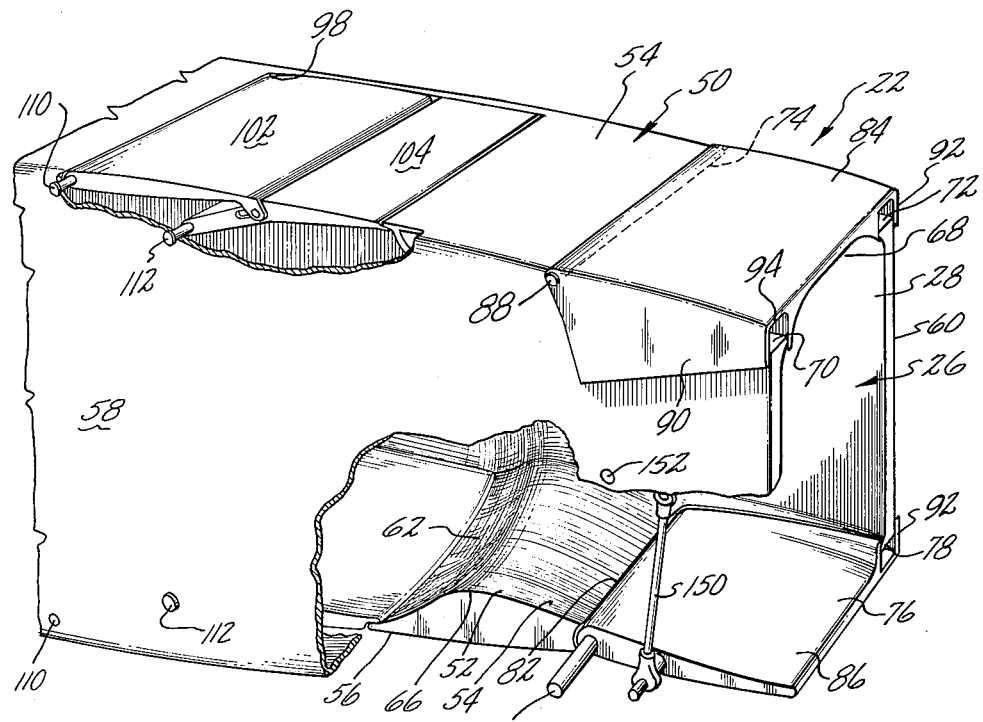

FIG. 5 is an enlarged perspective showing of my two-dimensional ejector type exhaust nozzle partially broken away to illustrate the cooperation between the secondary nozzle flaps and the fixed member in establishing a rectangular outlet for the secondary nozzle which smoothly changes in interior cross-sectional shape toward circular cross section in a forward direction in such a fashion that it would culminate as a circular cross section at the primary nozzle.

Figure 6:
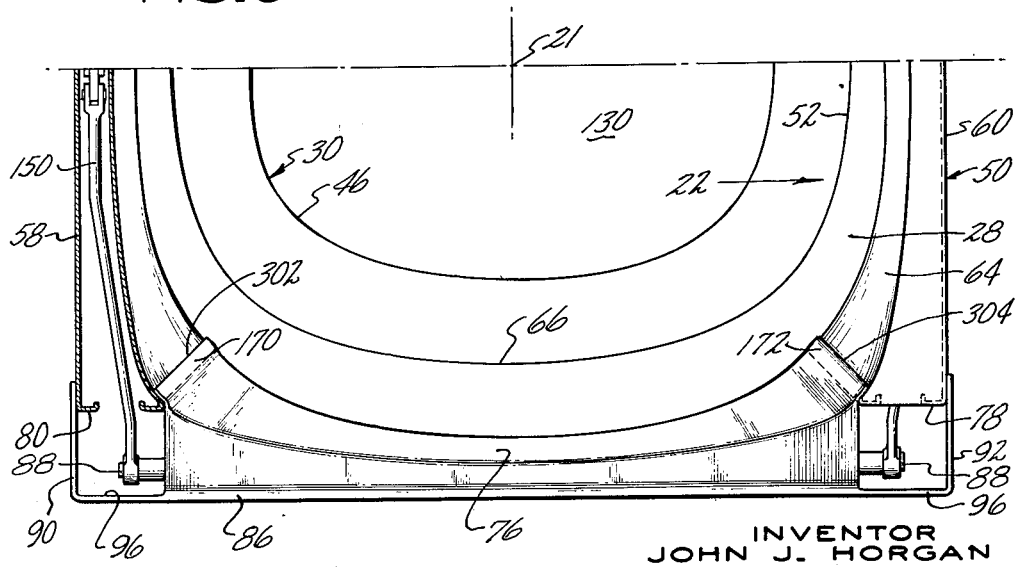

FIG. 6 is an enlarged partial showing of the outlet of my two-dimensional ejector type exhaust nozzle illustrating the contouring thereof and partially broken away to reveal concealed details.

Figure 1:
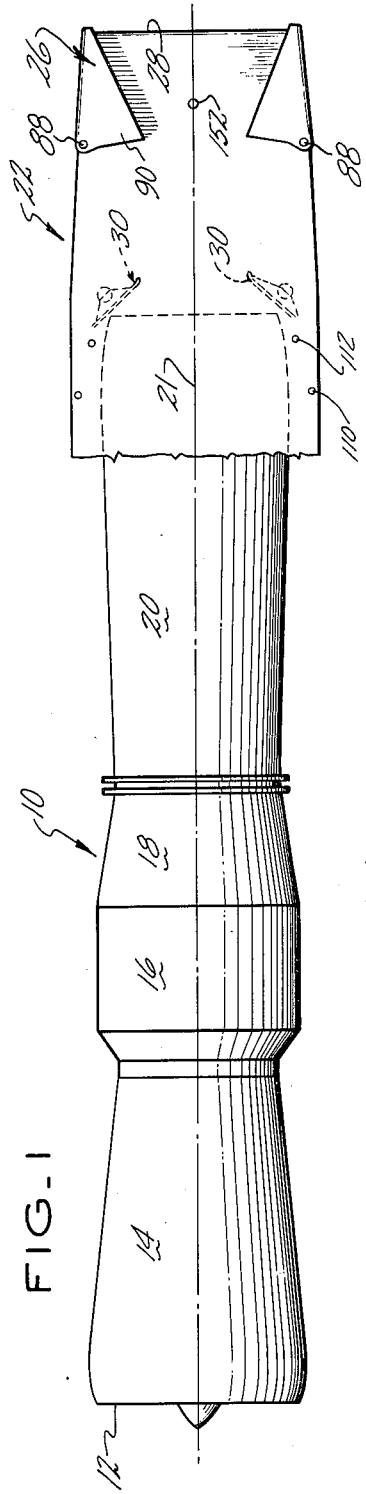
FIG. 1 is an external showing of a modern aircraft jet engine utilizing my two-dimensional ejector type exhaust nozzle.

Referring to FIG. 1 we see modern aircraft jet engine 10 which is preferably of circular cross section except rearward of primary nozzle 30 and concentric about axis 21 and which comprises air inlet 12, compressor 14, combustion chamber 16, turbine 18 and preferably afterburner 20 together with my two-dimensional ejector type exhaust nozzle 22. Engine 10 is of conventional design and preferably of the type fully disclosed in U.S. Patent Nos. 2,711,631 or 2,747,367 in which air enters compressor 14 through inlet 12 and is passed from compressor 14 in compressed fashion into burner 16 where heat is added thereto. Work is extracted from the air in passing through turbine 18 and it is discharged therefrom for reheating in afterburner 20, which may be of the type fully disclosed in U.S. Patent Nos. 2,846,842, 2,974,486, and 2,865,167. After passing through afterburner 20, the exhaust gases are discharged through primary nozzle 30 and then through secondary nozzle 26 and outlet 28 thereof to atmosphere to perform a thrust generating function.

My two-dimensional ejector type exhaust nozzle 22 is shown in greater particularity in its high speed condition in FIGS. 3, 5 and 6 and in its low speed condition in FIG. 4 to which reference will now be made.

First referring to FIG. 3 we see that nozzle 22 is concentric about engine axis 21 and comprises primary nozzle 30 which is of circular cross section and includes a plurality of circumferentially positioned and overlapping pivotal flaps 32 each of which includes a roller 34 bearing against cam surfaces 36 such that flaps 32 pivot inwardly and outwardly as said rollers 34 are caused to roll along cam surfaces 36 by any convenient means such as a plurality of axially extending shafts 38 which are pivotally attached thereto at 40 and caused to reciprocate back and forth by any convenient means such as a cylinder piston unit (not shown). Flaps 32 could also be actuated by reciprocating rods 38 each of which is attached to a cylindrical sleeve 42 which is in turn attached to each of flaps 32 so that said flaps are pivotal thereabout. It will be obvious to those skilled in the art that as rollers 34 are caused to roll along cam surfaces 36 by the reciprocation of rods 38, flaps 32 will be caused to pivot to their maximum diameter or maximum area position shown in FIGS. 3, 5 and 6 or to their minimum diameter or minimum area position shown in FIG. 4 and in both cases will define a convergent wall 44 and a nozzle throat 46 of circular cross section. Nozzle 22 further includes fixed member 50 which is straight sided and of rectangular exterior cross section as best shown in FIGS. 5 and 6 and which may well be either attached to or an extension of the nacelle which surrounds engine 10. Fixed member 50 includes inwardly concaved or convergent-divergent portion 52 which extends around the complete inner periphery of fixed member 50 in annular fashion, that is, which exists in each of top and bottom walls 54 and 56 and side walls 58 and 60 thereof. Convergent-divergent portion 52 includes convergent forward wall 62 and divergent after wall 64 which smoothly join to define throat 66. The side walls 58 and 60 of fixed member 50 extend rearwardly beyond the top walls 54 and 56 thereof such that a rectangular recess 68 is defined between the top surfaces 70 (see FIG. 5) and 72 and the rear surface 74 of top wall 54 while a similar rectangular recess 76 is defined between the bottom edges 78 and 80 (see FIGS. 5 and 6) of side walls 60 and 58 and the after wall 82 of bottom wall 64. Secondary flaps 84 and 86 are pivotally attached through elements such as transverse bars 88 at their forward ends to the after ends 74 and 82 of the top and bottom walls 54 and 56 of fixed member 50 and include square edges or flaps 90 and 92 which engage side walls 58 and 60 in sealing engagement as best shown in FIGS. 5 and 6 such that flaps 84 and 86 may be aerodynamically pivoted to an inner position wherein their inner surfaces 94 and 96 abut the top and bottom of side walls 58 and 60. Flaps 84 and 86 may also be aerodynamically pivoted to their maximum area or high speed flight position best shown in FIGS. 3, 5 and 6. It will be noted that at all times flaps 84 and 86 cooperate with the side walls 58 and 60 of fixed member 50 to define a secondary nozzle 26 which is of both rectangular exterior cross section and substantially rectangular interior cross section.

Fixed member 50 further includes rectangular apertures 98 and 100 in upper surface 54 and lower surface 56 thereof just forward of convergent-divergent portion 52 thereof and in substantial radial alignment with primary nozzle 30. At least two overlapping pivotal flaps 102 and 104 are positioned in rectangular aperture 98 and each are pivotally attached to the side walls 58 and 60 of fixed member 50 so as to be axially spaced, overlapping and pivotable inwardly and outwardly. Similarly, at least two pivotal blow-in doors 106 and 108 are located in rectangular aperture 100 and are pivotally attached to the side walls 58 and 60 of fixed member 50 at pivot points 110 and 112, respectively, and are of slightly curved contour as best shown in FIGS. 3 and 4. Doors 106 and 108 may be pivoted either aerodynamically or by cylinder-piston unit 114, which is connected to flaps 106 and 108 by reciprocating bars such as 116 and pivotal link mechanism 118, to the outer or closed position shown in FIG. 3 wherein blow-in doors 106 and 108 overlap and define a smooth exterior surface with bottom wall 56 of fixed member 50, thereby avoiding low pressure drag pockets therein during flight operation. Blow-in doors 106 and 108 may also be pivoted to their open or inner position shown in FIG. 4 wherein they overlap and define a smooth surface with the forward portion 120 of the bottom wall 56 of fixed member 50 and cooperate with the forward convergent edge 62 of the inner surface of member 50 to define secondary air passage 122 therebetween.

Secondary air flow such as ram air may be provided thru passage 142 between afterburner duct 124 and the forward portion 120 of fixed member 50 to provide cooling air around primary nozzle flaps 32 and over the inner surface of blow-in-doors 106 and 108 and the inner surface of fixed member 50 and secondary nozzle flaps 84 and 86.

My two-dimensional ejector type exhaust nozzle 22 also includes provisions for thrust reversal comprising a plurality of circumferentially positioned pivotal flaps 123 which are contoured to be received within the annular recesses 124 in fixed member 50 when in their retracted (FIG. 3 and FIG. 4 solid line) position and which may be caused to pivot by cylinder-piston unit 126 to their operable (FIG. 4) phantom position so that with blow-in doors 106 and 108 actuated to their FIG. 4 phantom position, the normal exhaust gas passage 130 is substantially blocked and the exhaust gases will be diverted by flaps 123 through annular gas passage 122 to atmosphere in a reverse thrust direction. Flips 123 are pivotally attached to links 132 which are in turn pivotally attached at their opposite end to support ring 134, which also serves to support cam surfaces 36. During thrust reversal operation, to insure that hot exhaust gases do not enter passage 142, sleeve valve 141 may be actuated by actuating means 114 to block ports 145 and hence passage 142 at the same time that the blow-in doors 106 and 108 are actuated open.

By the way of explaining the operation of my exhaust nozzle, let us refer to FIGS. 3 and 4. FIG. 3 shows my two-dimensional ejector type exhaust nozzle 22 in its high speed, and probably afterburner, position. In FIG. 3 primary nozzle 30 is in its maximum area and maximum diameter position as is secondary nozzle 26 and the blow-in doors 106 and 108 are closed. In the FIG. 3 position, engine exhaust gases from afterburner duct 124 pass over the convergent inner surface 44 of the primary nozzle 30 and thence through throat 46 thereof whereupon they commence expanding and contact the divergent expansion surface 140 defined by the divergent portion 64 of fixed member inner surface 52 and the inner surface 142 of flaps 84 and 86. Cooling air passes around the primary nozzle 30 and along said expansion surface 140 from the annular cooling air passage 142 which is defined between afterburner duct 124 and the forward portion 120 of fixed member 50. In the FIG. 3 position it will be noted that a smooth aerodynamic exterior surface is presented by the coaction which exists between fixed member 50, blow-in doors 106 and 108 and flaps 84 and 86. It will accordingly be seen that in the FIG. 3 or high speed position, my nozzle 22 is of the convergent-divergent type.

Referring to FIG. 4 we see my exhaust nozzle 22 in its low speed position wherein the primary nozzle 30 is at its minimum diameter and area position as is the secondary nozzle 26 and blow-in doors 106 and 108 are in their open or inner position. In the FIG. 4 position, the exhaust gases which are discharged from afterburner duct 124 pass along convergent surface 44 of flaps 30 and thence through throat 46 of the primary nozzle 30. Since it is unlikely that the exhaust gases would expand sufficiently to contact the inner surface 52 of fixed member 50 or the inner surfaces of flaps 84 and 88 before reaching outlet 28, even with flaps 84 and 88 pivoted to their inner (FIG. 4) position due to the aerodynamic pressure differential thereacross, secondary air is drawn into nozzle 22 through second gas passage 122 in ejector fashion due to the pressure differential exterior of an interior of nozzle 122 and thence passes along the inner surface of fixed member 50 and flaps 84 and 86 to fill the void which probably exists between the engine exhaust gas stream and these members. Due to the pressure differential which exists exterior and interior of nozzle 22 during its low speed or FIG. 4 condition, if it were not for the ejector type of secondary air flow just described, low pressure atmospheric air would act against the inner surface of members 50 and flaps 84 and 86 to create drag.

It has been found desirable to prevent the gravitational and momentum effect on lower flap 86 during landing by utilizing a mechanism such as Z-bar mechanism 150 to prevent flaps 84 and 86 from moving in the same vertical direction at the same time while permitting movement of these flaps in opposite vertical direction. During landing operation, it is quite possible that flap 86, which is free floating, could be bounced downwardly by airplane-to-runway contact to strike the runway. To prevent this, the Z-bar mechanism 150 is attached to both flaps 84 and 86 and connected to fixed member 50 at pivot points such as 152 so that if the landing operation tends to throw flap 86 downwardly, there would be an equal tendency for flap 84 to be thrown downwardly also and hence, due to the action of Z-bar mechanism 150, flap 86 would be prevented from moving downwardly due to the equal and balanced inclination of flap 84 to so move. Z-bar 150 will, of course, permit flaps 84 and 86 to move toward or away from each other.

Figure 2:
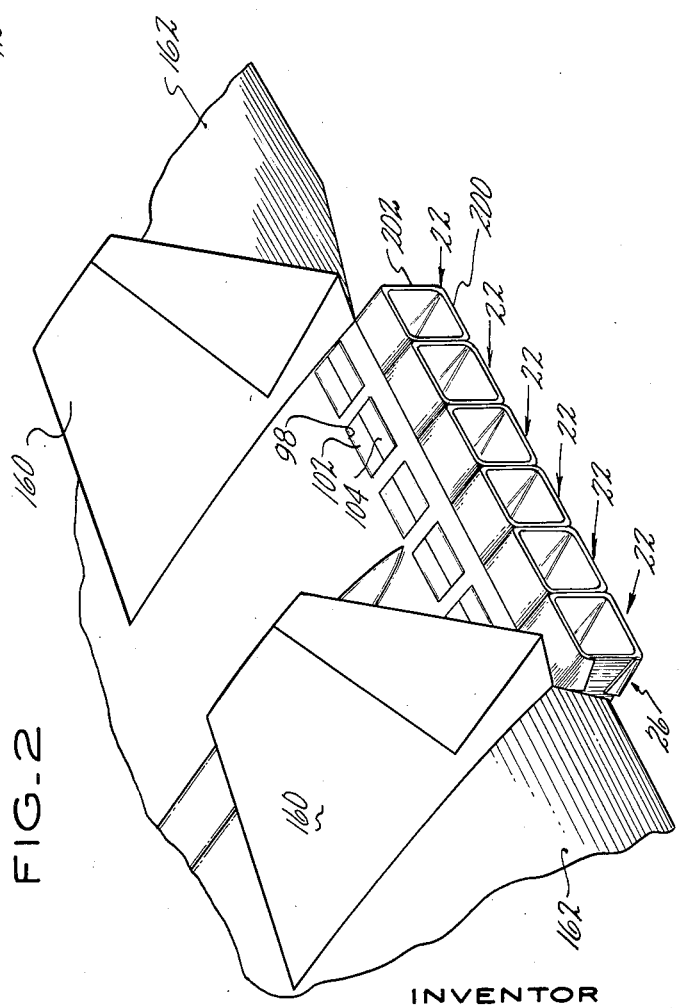
FIG. 2 is a perspective showing of a plurality of aircraft jet engines utilizing my exhaust nozzle and located in abutting position or location along the trailing edge of an aircraft wing to present minimum drag surface therebetween.

As explained previously, it is an important teaching of my invention that my fixed member 50 be of rectangular, exterior cross section and that my secondary nozzle 26 as defined by fixed member 50 and flaps 84 and 86 be of rectangular interior cross section and also be adaptable to cooperate with a primary nozzle of circular cross section. The reason for the importance of this construction requirement is that there are engine performance and construction benefits to be gained by utilizing an engine of circular cross section and hence a primary nozzle of circular cross section and there are aerodynamic advantages to be gained in multi-engine installations by utilizing a rectangular fixed member and rectangular secondary nozzle outlet. When the secondary nozzle presents a rectangular outlet such as 28, the various engines in a plural engine installation may be caused to abut in lateral alignment as best shown in FIG. 2. With this construction, it will be noted that there is minimal blunt, downstream surface area such as 200 and 202 (FIG. 2) for low pressure gases to act against and hence create drag. Had the secondary outlet 28 been of circular cross section, there would have been substantial drag creating areas between the abutting engines. Accordingly, my exhaust nozzle permits the drag abating clustering of the engines as best shown in FIG. 2 wherein the engines 22 are carried in wing 160 of an aircraft and more particularly in the trailing edge 162 thereof. It will be noted that blow-in doors 102 and 104 blend smoothly with the surface of wing 160 in this construction.

To permit the utilization of a rectangular secondary outlet and a circular primary nozzle, it is necessary that my two-dimensional ejector type exhaust nozzle 22 be specially contoured as best shown in FIGS. 5 and 6. Since the pressures acting against the inner surface of fixed member 50 and flaps 84 and 86 are maximum in the high speed FIG. 3 position, it is therefore important that exhaust nozzle 22 present maximum sealing and optimum contouring in this position. Accordingly, fixed member 50 and flaps 84 and 86 are so contoured that with flaps 84 and 86 in their outer or FIG. 3, 5 and 6 position, and with these flaps forming a rectangular outlet with the side walls of 58 and 60 of fixed member 50, the interior of fixed member 50 and flaps 84 and are shaped such that they constitute a transition section smoothly blending four lines which would be drawn from the 45°, 135°, 225°, and 315° positions of throat 46 of circular primary nozzle 30 to the respective corners of rectangular outlet 28. Sealing flaps 170 and 172 are attached to flaps 84 and 86 such that with the flaps in their outer or FIG. 3, 5 and 6 position, sealing strips 170 and 172 bear against the interior surface of fixed member 50 such that there is a sealed connection between the flap inner surface and the fixed member 50 inner surface. When flaps 84 and 86 move to their inner position, seal strips 170 and 172 lose contact with the inner surface of fixed member 50 but this is of minor importance due to the fact that the exhaust nozzle is operating in the FIG. 4, low speed and low pressure condition and hence leakage is of minor importance.

Referring to FIGS. 5 and 6 it will be noted that flaps 84 and 86 extend the full horizontal dimension of rectangular outlet 28 of secondary nozzle 26 and then converging forward thereof along lines 302 and 304 toward primary nozzle 30 defining an angle with axis 21. Accordingly, the horizontal dimensions of flaps 84 and 86 diminish progressively forward of outlet 28 such that these flaps are of considerably smaller area and dimension than had lines 302, 304 extended parallel to axis 21. This reduced area and dimensions establish the actuating force requirements of flaps 84 and 86 in a range such that these flaps may be aerodynamically actuated and aerodynamically assisted such that a smaller flap actuated force is required.

It is to be understood that the invention is not limited to the specific embodiment herein illustrated and described but may be used in other ways without departure from its spirit as defined by the following claims.

I claim:

1. A two dimensional ejector type exhaust nozzle comprising a primary nozzle of circular cross section, a fixed member of rectangular exterior cross section spaced downstream from said primary nozzle to define a secondary air passage therebetween and an exhaust gas passage therewith, said fixed member having recesses in the top and bottom at the after end thereof, a flap positioned in each of said recesses and pivotally attached to said fixed member to cooperate therewith to define a variable area outlet, nacelle means of rectangular exterior cross section located forward of and connected to said fixed member and enveloping said primary nozzle and having apertures in the top and bottom thereof in substantial radial alignment with said secondary air passage, at least one blow-in door located in each of said apertures and attached to said nacelle to be pivotable between an inner position wherein air may pass from the exterior of said nacelle into said secondary air passage and an outer position wherein flow thru said apertures is blocked, the interior of said fixed member and said flaps being so shaped that said flaps and said nacelle define a rectangular outlet in all flap positions and so that with said flaps in their outer position, the interior of said fixed member and flaps smoothly change in transition in an upstream direction from rectangular cross-sectional shape at said outlet toward circular cross-sectional shape.

2. A two dimensional ejector type exhaust nozzle comprising, a variable area primary nozzle of circular cross section, a fixed member of rectangular exterior cross section spaced downstream from said primary nozzle to define a secondary air passage therebetween and an exhaust gas passage therewith, said fixed member having recesses in the top and bottom at the after end thereof, a flap positioned in each of said recesses and pivotally attached to said fixed member to cooperate therewith to define a variable area outlet, nacelle means of rectangular exterior cross section located forward of and connected to said fixed member and enveloping said primary nozzle and having apertures in the top and bottom thereof in substantial radial alignment with said secondary air passage, at least one blow-in door located in each of said apertures and attached to said nacelle to be pivotable between an inner position wherein air may pass from the exterior of said nacelle into said secondary air passage and an outer position wherein flow thru said apertures is blocked, the interior of said fixed member and said flaps being so shaped that said flaps and said nacelle define a rectangular outlet in all flap positions and so that with said flaps in their outer position, the interior of said fixed member and flaps define a divergent gas expansion surface and smoothly change in an upstream direction from rectangular cross-sectional shape at said outlet toward circular cross-sectional shape.

3. A two dimensional ejector type exhaust nozzle comprising a variable area primary nozzle of circular cross section, a fixed member of rectangular exterior cross section spaced downstream from said primary nozzle to define a secondary air passage therebetween and an exhaust gas passage therewith, said fixed member having recesses in the top and bottom at the after end thereof, a flap positioned in each of said recesses and pivotally attached to said fixed member to cooperate therewith to define a variable area outlet, nacelle means of rectangular exterior cross section located forward of and connected to said fixed member and enveloping said primary nozzle and having apertures in the top and bottom thereof in substantial radial alignment with said secondary air passage, at least one blow-in door located in each of said apertures and attached to said nacelle to be pivotable between an inner position wherein air may pass from the exterior of said nacelle into said secondary air passage and an outer position wherein flow thru said apertures is blocked, the interior of said fixed member and said flaps being so shaped that said flaps and said nacelle define a rectangular outlet in all flap positions and so that with said flaps in their outer position, the interior of said fixed member and flaps smoothly change in transition in an upstream direction from rectangular cross-sectional shape at said outlet toward circular cross-sectional shape, and a Z-bar connected to each of said flaps to prevent both flaps from moving in the same vertical direction at the same time.

4. A two dimensional ejector type exhaust nozzle comprising a variable area primary nozzle of circular cross section, a fixed member of rectangular exterior cross section spaced downstream from said primary nozzle to define a secondary air passage therebetween and an exhaust gas passage therewith, said fixed member having recesses in the top and bottom at the after end thereof, a flap positioned in each of said recesses and pivotally attached to said fixed member to cooperate therewith to define a variable area outlet, nacelle means of rectangular exterior cross section located forward of and connected to said fixed member and enveloping said primary nozzle and having apertures in the top and bottom thereof in substantial radial alignment with said secondary air passage, at least one blow-in door located in each of said apertures and attached to said nacelle to be pivotable between an inner position wherein air may pass from the exterior of said nacelle into said secondary air passage and an outer position wherein flow thru said apertures is blocked, means to actuate said blow-in doors, the interior of said fixed member and said flaps being so shaped that said flaps and said nacelle define a rectangular outlet in all flap positions and so that with said flaps in their outer position, the interior of said fixed member and flaps smoothly change in an upstream direction from rectangular cross-sectional shape at said outlet toward circular cross-sectional shape, and a Z-bar connected to each of said flaps to prevent both flaps from moving in the same vertical direction at the same time while permitting said flaps to move in opposite vertical directions, and thrust reversal means located in said fixed member and actuated to substantially block gas flow thru said gas passage and redirect gas flow thru said secondary air passage.

5. A two dimensional ejector type exhaust nozzle comprising a variable area primary nozzle of circular cross section, a fixed member of rectangular exterior cross section spaced downstream from said primary nozzle to define a secondary air passage therebetween and an exhaust gas passage therewith, said fixed member having recesses in the top and bottom at the after end thereof, a flap positioned in each of said recesses and pivotally attached to said fixed member to cooperate therewith to define a variable area outlet, a nacelle means of rectangular exterior cross section located forward of and connected to said fixed member and enveloping said primary nozzle and having apertures in the top and bottom thereof in substantial radial alignment with said secondary air passage, at least one blow-in door located in each of said apertures and attached to said nacelle to be pivotable between an inner position wherein air may pass from the exterior of said nacelle into said secondary air passage and an outer position wherein flow thru said apertures is blocked, means to pass cooling air between said primary nozzle and said blow-in doors, means to block said cooling air flow, the interior of said fixed member and said flaps being so shaped that said flaps and said nacelle define a rectangular outlet in all flap positions and so that with said flaps in their outer position, the interior of said fixed member and flaps smoothly change in an upstream direction from rectangular cross-sectional shape at said outlet toward circular cross-sectional shape, and a Z-bar connected to each of said flaps to prevent both flaps from moving in the same vertical direction at the same time while permitting movement in opposite vertical directions, and thrust reversal means located in said fixed member and actuatable to substantially block gas flow thru said gas passage and redirect gas flow thru said secondary air passage.

6. A two dimensional ejector type exhaust nozzle comprising a fixed member defining an exhaust gas passage and being of rectangular exterior cross section and having a substantially rectangular recess at both the top and bottom of its after end and further having substantially rectangular apertures in the top and bottom thereof forward of said recesses and still further having concave interior walls between said recesses and said apertures, a primary nozzle of circular cross section positioned within said fixed member substantially in alignment with said apertures, overlapping blow-in doors located in each of said apertures and attached to said fixed member to be pivotal between an outer position wherein they block said apertures and an inner position wherein they define a secondary air passage with the forward part of said concave interior wall, and a flap located in each of said recesses and pivotally attached at its forward end to said fixed member to define a rectangular outlet therewith, the interior of said flaps and said fixed member being so shaped that when said flaps are in their outer position, the interior of said flaps and said fixed member are of rectangular cross section at said outlet and smoothly blend toward circular cross section forward thereof.

7. A two dimensional ejector type exhaust nozzle comprising a fixed member defining an exhaust gas passage and being of rectangular exterior cross section and having a substantially rectangular recess at both the top and bottom of its after end and further having substantially rectangular apertures in the top and bottom thereof forward of said recesses and still further having concave interior walls between said recesses and said apertures, a variable area primary nozzle of circular cross section position within said fixed member substantially in alignment with said apertures, overlapping blow-in doors located in each of said apertures and attached to said fixed member to be pivotal between an outer position wherein they block said apertures and an inner position wherein they define a secondary air passage with the forward part of said concave interior wall, and a flap located in each of said recesses and pivotally attached at its forward end to said fixed member to define a rectangular outlet therewith, the interior of said flaps and said fixed member being so shaped that when said flaps are in their outer position, the interior of said flaps and said fixed member are of rectangular cross section at said outlet and smoothly blend toward circular cross section forward thereof, said primary nozzle, said blow-in doors, said fixed member and said flaps being so shaped, positioned and cooperating that with said primary nozzle and said rectangular outlet at maximum area and with said blow-in doors closed, a high speed convergent-divergent exhaust nozzle is formed with said primary nozzle forming the convergent portion and throat thereof and said fixed member and flaps forming the divergent portion thereof and further that with said primary nozzle and said rectangular outlet at minimum area and with said blow-in doors open, a low speed convergent-divergent exhaust nozzle is formed with said primary nozzle forming the convergent portion and throat thereof and with secondary air flowing thru said secondary air passage and along the inner surface of said fixed member and flaps.

8. A two dimensional ejector type exhaust nozzle concentric about an axis and comprising a fixed member defining an exhaust gas passage and being of rectangular exterior cross section and having a substantially rectangular recess at both the top and bottom of its after end and further having substantially rectangular apertures in the top and bottom thereof forward of said recesses and still further having concave interior walls between said recesses and said apertures including a convergent forward wall and a divergent after wall joined smoothly by a throat, a variable area primary nozzle of circular cross section positioned within said fixed member substantially in alignment with said apertures and being actuatable between a minimum area and a maximum area position, overlapping blow-in doors located in each of said apertures and attached to said fixed member to be pivotal between an outer position wherein they block said apertures and form a smooth exterior surface with said fixed member and an inner position wherein they define a secondary air passage with said convergent forward wall of said concave interior walls, and a flap located in each of said recesses and attached at its forward end to said fixed member to define a rectangular outlet therewith and being pivotable between a minimum area position wherein the flap inner surfaces define a convergent continuation of said divergent after wall and a maximum area position wherein the flap inner surfaces define a divergent continuation of said divergent after wall, said flaps having square edges along their sides which edges overlap the sides of said fixed member to define square joints therewith, the interior of said flaps and said fixed member being so shaped that when said flaps and said primary nozzle are in their maximum area positions, the interior of said flaps and said fixed member are so shaped to define a smooth joining of lines drawn from the 45°, 135°, 225° and 315° positions of said primary nozzle to the respective corners of said rectangular outlet so as to be of rectangular cross section at said outlet and smoothly blend forward thereof in transition to be of circular cross section at said primary nozzle.

No references cited.